Aug. 30, 1949.　　　A. H. BARNARD ET AL　　　2,480,624
SELECTOR SYSTEM
Filed Jan. 2, 1947
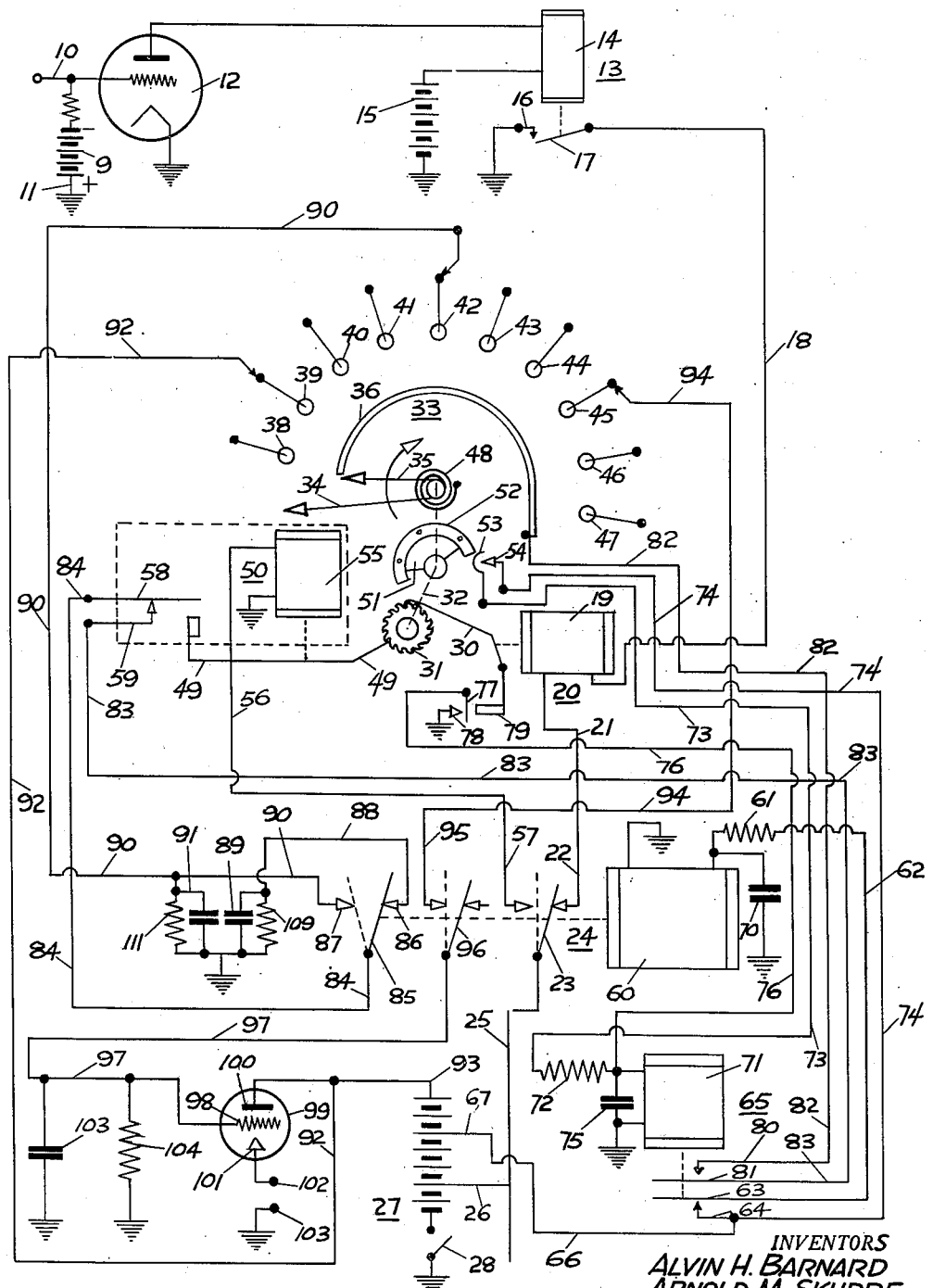
INVENTORS
ALVIN H. BARNARD
ARNOLD M. SKUDRE
BY
Elmer J. Gorn
ATTORNEY Patented Aug. 30, 1949

2,480,624

UNITED STATES PATENT OFFICE 2,480,624

SELECTOR SYSTEM

Alvin H. Barnard, Portland, Oreg., and Arnold M. Skudre, Somerset, Mass., assignors to Raytheon Manufacturing Company, a corporation of Delaware Application January 2, 1947, Serial No. 719,898

4 Claims. (Cl. 177—353)

The present invention relates to code responsive electric circuits and more particularly to an electric circuit which may be termed a coded selective ringing circuit and which is adapted to energize an output load only after application to its input terminals of a plurality of series of electric current pulses of a predetermined number and in predetermined series sequence.

It is an object of this invention to provide an improved code responsive electric circuit having a pair of input terminals and an output load circuit, together with means in the circuit to respond to a plurality of series of electric current pulses to charge a first storage device upon application to the input terminals of a predetermined number of pulses in a first series of pulses, to charge a second storage device in accordance with the charge of the first device upon application of a predetermined number of pulses in a second series of pulses, and to energize the load circuit by connecting the second storage device to the load upon application of a predetermined number of pulses in a third series of pulses.

It is also an object of this invention to provide an improved code responsive electric circuit of the aforementioned type having only a single bank stepping selector switch for controlling the charging of the storage devices and the energization of the load circuit in response to the plurality of series of predetermined electric pulses applied in predetermined sequence to the input terminals.

The series of electric pulses may be obtained by intermittently connecting a source of electric current to the input terminals of the circuit. A telephone dial mechanism is especially suitable for this purpose. The conventional dial mechanism would connect the electric current to the input terminals in a manner to produce pulses of uniform pulse duration and uniform pulse interval, the frequency of pulses being of approximately eight pulses per second. When obtaining a plurality of series of pulses from such mechanism it is usual that the time interval between each series of pulses of a predetermined number is greater than the interval of time between each pulse in a series of pulses.

It is therefore a further object of this invention to provide a code responsive electric circuit adapted to energize a load circuit in response to the application to its input terminals of a plurality of series of electric pulses having a predetermined number and a predetermined series sequence, the circuit having means responsive during the time interval between each series of pulses for performing the required sequential operation of the circuit upon application of a predetermined number of pulses in each series of pulses.

Further objects and advantages will be apparent upon reference to the following specification and drawing in which the single figure of the drawing is a schematic diagram of the code responsive circuit of this invention.

Referring to the drawing, the series of pulse signals are applied to the input terminals 10 and 11 connected between the grid and cathode of an electron tube 12. The plate of tube 12 is connected through the coil 14 of a relay 13 to the positive terminal of a plate supply battery 15 whose negative terminal is grounded as is also the cathode of tube 12. Tube 12 may be of any suitable type, such as, for example, the triode type 1L4 and the parameters of the tube and its circuit are such that the tube is normally biased to cut-off by the grid battery 9 in the absence of an electric pulse signal of positive polarity applied to the terminals 10 and 11 and conversely is conductive whenever such a pulse signal is applied. Thus the plate circuit relay 13 is energized whenever an electric pulse of proper polarity is applied to the input terminals 10 and 11.

Relay 13 is provided with a pair of normally open contacts 16 and 17 which are adapted to be closed upon energization of the relay. Contact 16 of relay 13 is grounded as shown and contact 17 is connected by line 18 through the coil 19 of ratchet relay 20 to line 21, through contact 22 and switch arm 23 of the three-pole double-throw relay 24 and by line 25 to a positive terminal 26 of a battery 27 whose negative terminal is grounded to complete the circuit through an on-off switch 28. The three-pole double-throw relay 24 is shown in the energized position and with its contacts in such position it will be seen that the ratchet relay 20 will be energized whenever relay 13 is energized to close its contacts 16 and 17 upon application of an electric pulse of proper polarity to the input terminals 10 and 11.

Ratchet relay 20 is provided with a ratchet arm or armature 30 engaging a ratchet wheel 31 fixed to the rotary shaft 32 of a single bank rotary stepping selector switch 33. Also mounted on the shaft 32 is a contact selector arm 34 and a wiper arm 35. The wiper arm 35 is electrically connected with the contact arm 34 and its end makes electrical contact with an arcuate commutator section 36 as the shaft 32 is rotated clockwise from the starting position shown. The selector arm 34 is adapted to make electrical contact upon each rotary step of the selector switch 33 with a selected one of the equally spaced contacts 38–47. The ratchet relay 20 having the ratchet arm 30 in engagement with the ratchet wheel 31 is so designed that each time it is energized the shaft 32 is thereby rotated to move the selector arm 34 through an angular distance equal to the distance between the starting position and the first contact 38 or between each of the contacts 38–47.

A spring 48 is provided to urge the shaft 32 to rotate in a counter-clockwise direction back to the starting position but the locking armature 49 of a reset relay 50 normally engages the ratchet wheel 31, as shown, to prevent such counter-clockwise rotation of the shaft 32. Thus, each time the ratchet relay 20 is energized, the shaft 32 will be clockwise rotated by an amount sufficient to step advance the contact selector arm 34 from either the starting position to contact 38 or from one of the contacts 38–47 to the next of said contacts. The wiper arm 35 attached to the shaft 32 is also moved clockwise coincident with the movement of the contact arm 34 and thereby connects a selected one of the contacts 38–47 to the commutator section 36.

Also carried by the shaft 32 is a cam member 51 having an insulated cam surface 52 adapted to engage the spring contact arm 53 and cause it to make electrical contact with the fixed contact 54. Contacts 53 and 54 constitute a normally open switch but the cam 51 is so positioned on the shaft 32 that, whenever it is rotated to move the rotary switch contact arm 34 to a position engaging one of the contacts 38—47, the cam surface 52 will be caused to engage the spring contact 53 to close the circuit between contacts 53 and 54.

One terminal of the coil 55 for the reset relay 50 is grounded and the other terminal is connected by line 56 to contact 57 of the three-pole double-throw relay 24. When the relay 24 is deenergized from the position shown, the contact 57 is connected by switch arm 23 to line 25 and the battery 27 to thus energize the reset relay and disengage the locking armature 49 from the ratchet wheel 31 to permit the shaft 32 to rotate counter-clockwise in response to the spring 48 back to the starting position shown. Energization of the reset relay 50 causing a full travel of the armature 49 also moves the spring contacts 58 and 59 from their normally closed position to the open circuit position for reasons to be later referred to.

One terminal of the relay coil 60 for the three-pole double-throw relay 24 is grounded and the other terminal is connected through a resistance 61 to line 62, through a pair of normally closed contacts 63 and 64 associated with the relay 65 to line 66 and positive terminal 67 of battery 27. Thus the three-pole double-throw relay 24 is maintained in the normally energized position shown so long as the relay 65 is normally deenergized in its position as shown. A high capacity condenser 70 is connected across the relay coil 60 to ground and due to the effects of its stored energy prevents the relay 24 from assuming the deenergized position immediately after the energization of relay 65 and the breaking of the circuit to relay coil 60 through contacts 63 and 64.

The time constant of the condenser relay circuit 70, 60 is selected to be a predetermined time interval long enough to permit the proper charging of condensers 89 or 91 as will be later referred to in a description of the operation of the circuit.

One terminal of the relay coil 71 for relay 65 is grounded and the other terminal is connected through resistance 72 to line 73 and spring contact 53 which when closed with contact 54 connects through lines 74 and 66 to a positive terminal 67 of the battery 27. A condenser 75 is connected across the relay coil 71 to ground and the constants of the circuit, including the relay coil 71, resistance 72 and condenser 75, are such that the condenser 75 will not be sufficiently charged so that the relay 65 will be energized until after a predetermined time following the rotation of the shaft 32 and the closing of the contacts 53 and 54 by the cam surface 52. Furthermore, the ungrounded terminal of relay coil 71 is also connected through line 76 to a switch arm 77 of a normally open switch having a grounded contact 78. Thus, whenever the ratchet relay 20 is energized during the application of a pulse to the input terminals 10 and 11, the ratchet arm 30, on the end of which is an insulated striker 79, will move the switch arm 77 into engagement with the grounded contact 78 upon full travel of the ratchet arm 30 to discharge condenser 75 and short circuit relay coil 71.

Upon review of the circuits thus far described, including the circuit for energizing the relay coil 71 of relay 65, it will be seen that the relay 65 is normally deenergized at the beginning of a series of pulses while the rotary stepping switch is in the starting position. When the first pulse of a series of pulses is applied to the input terminals 10 and 11, the relay 65 is deenergized and relay 24 is energized to the position shown and the shaft 32 is rotated counter-clockwise to the contact position 38 corresponding to the application of one pulse. At this time the cam surface 52 has closed contacts 53 and 54 so that the condenser 75 should start to charge. However, during the duration of the pulse, the ratchet arm 30 is energized to close switch arm 77 with grounded contact 78 and short circuit condenser 75. At the end of the pulse duration an interval between pulses occurs, which interval is of a selected duration as has been previously described. During the pulse interval the ratchet arm 30 is in the deenergized position and switch contacts 77 and 78 are open, removing the short circuit across condenser 75 and permitting it to charge from the battery 27 through lines 66, 74, contacts 53 and 54, line 73 and resistor 72. If the pulse interval is greater than the selected pulse interval as would occur at the end of a series of pulses, the condenser 75 would become fully charged, thus energizing relay 65 to open the normally closed contacts 63 and 64 and thereby deenergize relay 60 which would in turn move the switch arm 23 to contact 57 and energize the reset relay 50 for permitting the shaft 32 and contact arm 34 to move counter-clockwise back to the starting position shown. Should the second pulse be received after no longer than the selected pulse interval, however, the ratchet arm 30 would advance the switch arm 34 to the second contact position 39 and again close contacts 77 and 78 to short circuit the relay coil 71 and discharge the condenser 75 of its charge thus acquired without permitting the energization of relay 65 which would have ultimately resulted in the energization of the reset relay 50 as previously described.

Relay 65 is also provided with a pair of normally open contacts 80 and 81. Contact 80 is connected by line 82 with the arcuate commutator section 36 of the rotary stepping switch 33 and contact 81 is connected by line 83 with the normally closed contacts 58 and 59 of the reset relay 50 to line 84 and switch arm 85 associated with contacts 86 and 87 of the three-pole double-throw relay 24. Contact 86 is connected by line 88 to the first storage condenser 89 paralleled by a high resistance 109 and contact 87 is connected by line 90 to the second storage condenser 91 paralleled by high resistance 111. Line 90 also connects with contact 42 of the selector switch 33 which in the present description has been selected to correspond to the position of the selector switch contact arm 34 for the correct number of pulses in the second series of pulses.

Line 92 connects the high positive terminal 93 of battery 27 to the selector contact 39 corresponding to the position of the contact arm 34 for the correct predetermined number of pulses in the first series of pulses.

Contact 45 of selector switch 33 corresponding to the selected position for the contact arm 34 after receiving the correct predetermined number of pulses in the third series of pulses, is connected by line 94 to contact 95 which when the three-pole double-throw relay 24 is in the deenergized position of the dotted lines is connected through switch arm 96 to line 97 and the grid 98 of thyratron 99. The plate 100 of thyratron 99 is connected to the positive terminal of battery 93 and the cathode 101 is connected through a suitable output load 102 to ground. The condenser 103 and resistor 104 connected between the grid 98 and ground normally prevent the thyratron 99 from conducting should the positive voltage in line 97 be less than a certain amount.

Consider now the operation of the circuit described, which as shown in the drawing has been set up to actuate the output circuit at terminals 102 and 103 upon receiving a first series of two pulses, a second series of five pulses and third series of eight pulses in that series sequence. In other words the number 258 must be dialed at the transmitter to produce the correct sequence of three series of pulses having the correct predetermined number of pulses in each series. Since the operations of relays 13, 20, 24, 50 and 65 have already been individually described, they will not be referred to again in detail except where necessary to show proper correlation of the various sequential function of the circuit.

Assuming the first series of two pulses to be properly received and applied to the input terminals 10 and 11 with not more than the selected pulse interval between pulses as previously referred to, the selector switch contact arm 34 will be advanced to the position of contact 39. The time interval between a series of pulses is of course greater than the pulse interval and is long enough to permit condenser 75 through the now closed contacts 53 and 54 to become fully charged, thus energizing relay 65 to close its contacts 80 and 81 and open its contacts 63 and 64. Opening of contacts 63 and 64 is responsive to initiate the return of selector switch arm 34 to its starting position and breaks the circuit to the coil of relay 24 which causes the high capacity condenser 70 to start to discharge following the discharge of which the relay 24 will be deenergized. At the same time during the interval of initiation and before relay 24 becomes deenergized, since contacts 80 and 81 are now closed, the full voltage of the battery 27 connected by line 92 to contact 39 is connected through selector arm 34, commutator 36, line 82, contacts 80 and 81, line 83, contacts 58 and 59, line 84, switch arm 85, contact 86, and line 88 to charge the first storage device or condenser 89. Upon complete discharge of condenser 70, the relay 24 is deenergized to energize the reset relay 50 through line 56, contact 57, switch arm 23, line 25 and battery 27. Thereupon, the return of the selector arm 34 to the starting position opens contacts 53 and 54 to deenergize relay 65 to the position shown for again energizing relay 24 so that the ratchet relay 20 may be again operated upon application of the second series of electric pulses.

Assuming the second series of pulses to be of the correctly spaced number of five pulses, the selector arm 34 will now be advanced to the position of contact 42 where it will remain for sufficient time to permit condenser 75 to become fully charged and relay 65 to be thereby energized. Energization of relay 65 will again initiate the return of selector switch arm 34 to the starting position by opening contacts 63 and 64 and closing contacts 80 and 81 which thereby transfers the charge of the first condenser 89 through line 88, contact 86, switch arm 85, line 84, contacts 58 and 59, line 83, contacts 80, 81, line 82, commutator 36, selector arm 34, contact 42, and line 90 to the second storage device or condenser 91. Following the aforesaid opening of contacts 63 and 64 and upon the discharge of the condenser 70, the relay 24 will be deenergized to actuate the reset relay 50 as previously described. It will be noted that at this time the switch arm 85 would be connected through contact 87 with the now charged second condenser 91 but the actuation of reset relay 50 opens contacts 58 and 59 to prevent any improper discharge of condenser 91 through the rotary selector switch 33.

Now, assuming the third series of eight pulses to be received with the correct pulse intervals, the selector arm 34 will be advanced to the position of contact 45 where it will remain at the end of the pulse series for a long enough time to permit condenser 75 to be fully charged and relay 65 to be energized, thus closing contacts 80 and 81 and opening contacts 63 and 64. The opening of contacts 63 and 64 again breaks the circuit to relay coil 60 and condenser 70 which initiates the return of switch arm 34, as previously described, after a complete discharge of condenser 70 to deenergize relay 24 and energize reset relay 50. It will be noted that during the receiving of the third series of pulses, the contacts 58 and 59 are closed so that the potential of the charge of condenser 91 is connected to line 83 and upon the closing of contacts 80 and 81 is connected to line 82, commutator 36, selector arm 34, contact 45 and line 94 to contact 95. When relay 24 is deenergized, as aforesaid, the charge of condenser 91 is now applied to contact 95, is connected through switch arm 96 and line 97 to the grid 98 of thyratron 99 to fire the thyratron and energize the load circuit at the output terminals 102 and 103. It should be pointed out that contacts 58 and 59 of reset relay 50 are not opened immediately upon deenergization of relay 24, due to the fraction of time necessary for the locking armature 49 to be moved the full travel sufficient to bring the striker into engagement with the contacts 58 and 59, and it is during this time fraction that the charge of condenser 91 is connected to the thyratron grid 98.

From the foregoing description, it will be seen that the thyratron 99 can not be fired until after the correct sequence of three series of pulses, the first series enabling the charging of a first condenser 89, the second series of pulses transferring the charge of condenser 89 to condenser 91, and the third series connecting the charged condenser 91 to the grid of the thyratron 99. As a further protection against undesired operation of the output thyratron, the time constants for condensers 89 and 91 as determined by the resistances of their respective resistors 109 and 111 may be suitably correlated with the total time interval for the three pulse series, including the intervals between pulse series and the pulse intervals, together with total number of pulses so that there will be insufficient charge left on condenser 91 for firing the thyratron 99.

In the event that a wrong number of pulses in the first series of pulses is applied to the input terminals 10 and 11, the selector arm 34 will be returned to the starting position without enabling the charging of the first condenser 89. Should more than the predetermined number of two pulses be applied, the contact selector arm 34 will have paused at contact 39 for only the time interval equal to the pulse duration and the pulse interval which as already noted is not sufficient time equal to the time interval between pulse series to permit condenser 75 and relay 65 to be energized so that relay 24 may be deenergized for connecting the contact 39 with the condenser 89. Similarly the second series of pulses must be of the correct predetermined number in order that the first condenser 89 may be connected with the second condenser 91 regardless of whether the first condenser 89 has been previously charged in response to a correct number of pulses in the first series of pulses. Finally, the correct predetermined number of pulses in the third series of pulses must be applied to connect the second condenser 91 with the grid of the thyratron tube 99 which if the preceding two series of pulses have been of the predetermined number and sequence will have sufficient positive charge to fire the thyratron tube 99 and supply the signal at the output terminals 102 and 103. In order to reset the system after the thyratron 99 has been fired, the on-off switch 28 may be moved to the open circuit position which will thereby stop conduction in the thyratron tube.

As specifically described, the circuit has been shown to respond to the application of three series of pulses comprising two pulses in the first series, five pulses in the second series and eight pulses in the third series. In order to change the coded number of pulses to which the circuit will respond, it is only necessary to reconnect lines 90, 92 and 94 with different selected ones of the contacts 38–47 corresponding to the new selected numbers of pulses in the series of pulses. Changing the connection of line 92 will change the predetermined number of pulses selected for the first series of pulses and changing the connection of line 90 will correspondingly change the predetermined number of pulses in the second series of pulses to which the circuit will respond, while changing the connection of line 94 will change the predetermined number of pulses in the third series of pulses. The contacts 38–47 have been shown to be a part of a single bank rotary stepping selector switch but it should be understood that any form of single bank stepping selector switch may be used other than the rotary type shown. For example, a linearly moved stepping switch may be used equally as well in the circuit of this invention.

Of course it is to be understood that this invention is not limited to the particular details as described above as many equivalents will suggest themselves to those skilled in the art. For example, other forms of electric storage devices, such as chokes, may be used instead of the condensers referred to. Also, it should be obvious that electron tubes may be substituted for the various relays and switches to perform the necessary sequential functions in the system of this invention. It is accordingly desired that the appended claims be given a broad interpretation commensurate with the scope of this invention within the art.

What is claimed is:

1. In a code responsive circuit having a step selector switch, a source of voltage, first and second charge storage devices, a relay having a normally open switch and a normally closed switch, means to operate said step selector switch to first, second, and third positions in response to three different pulse series representing a code, circuit means connecting said first charge storage device to said source via said normally closed switch and said step selector switch in said first position, circuit means connecting said second charge storage device to said first charge storage device via said normally closed switch and said step selector switch in said second position, output terminals, circuit means arranged to connect said second charge storage device to said output terminals via said normally open switch and said step selector switch in said third position, and means to operate said relay to open said normally closed switch and to close said normally open switch.

2. In a code responsive circuit having a step selector switch, a source of voltage, first and second charge storage devices, a relay having a normally open switch and a normally closed switch, means to operate said step selector switch to first, second, and third positions in response to three different pulse series representing a code, circuit means connecting said first charge storage device to said source via said normally closed switch and said step selector switch in said first position, circuit means connecting said second charge storage device to said first charge storage device via said normally closed switch and said step selector switch in said second position, output terminals, circuit means arranged to connect said second charge storage device to said output terminals via said normally open switch and said step selector switch in said third position, and means to operate said relay to open said normally closed switch and to close said normally open switch after a prescribed interval following the setting of a complete series of pulses into said step selector switch.

3. In a code responsive circuit having a step selector switch, a source of voltage, first and second charge storage devices, a relay having a normally open switch and a normally closed switch, means to operate said step selector switch to first, second, and third positions in response to three different pulse series representing a code, circuit means connecting said first charge storage device to said source via said normally closed switch and said step selector switch in said first position, circuit means connecting said second charge storage device to said first charge storage device via said normally closed switch and said step selector switch in said second position, output terminals, circuit means arranged to connect said second charge storage device to said output terminals via said normally open switch and said step selector switch in said third position, a second relay having a second normally open and a second normally closed switch, said second normally open switch being included in common in all said circuit means, said second normally closed switch being included in the energizing circuit of said first-mentioned relay, means to operate said second relay to close said second normally open switch and open said second normally closed switch, said first-mentioned relay being operative when deenergized to open said first-mentioned normally closed switch and to close said first-mentioned normally open switch, and means providing a time delay in the deenergization of said first-mentioned relay.

4. In a code responsive circuit adapted to provide an output signal in response to the receipt of a plurality of series of electric pulses having a prescribed number of pulses in each series, a step selector switch having a single bank of selectively engaged contacts and a main contact adapted to be connected successively to one after the other of said selectively engaged contacts when said switch is operated, first and second storage devices, first, second, and third code contacts connected each to a different one of said selectively engaged contacts in accordance with a prescribed code of which each digit corresponds to the number of pulses in one of said series, a source of voltage, a relay having a normally open switch and a normally closed switch, circuit means including said first code contact and said normally closed switch connecting said first storage device to said source via said step selector switch, circuit means including said second code contact and said normally closed switch connecting said first storage device to said second storage device via said step selector switch output terminals, circuit means including said third code contact and said normally open switch arranged to connect said second storage device to said output terminals via said step selector switch, and means to operate said relay to open said normally closed switch and to close said normally open switch after a prescribed interval following the setting of each complete series of pulses into said step selector switch.

ALVIN H. BARNARD.
ARNOLD M. SKUDRE.

REFERENCES CITED

The following references are of record in the file of this patent:

UNITED STATES PATENTS

| Number | Name | Date |
| --- | --- | --- |
| 2,063,354 | Thorp | Dec. 8, 1936 |
| 2,168,198 | Frank | Aug. 1, 1939 |
| 2,441,145 | Hansen | May 11, 1945 |